March 22, 1966 A. ROBY, SR Re. 25,983
AUTOMATIC DEVICE FOR TRIGGERING MECHANISMS
Original Filed Sept. 22, 1960
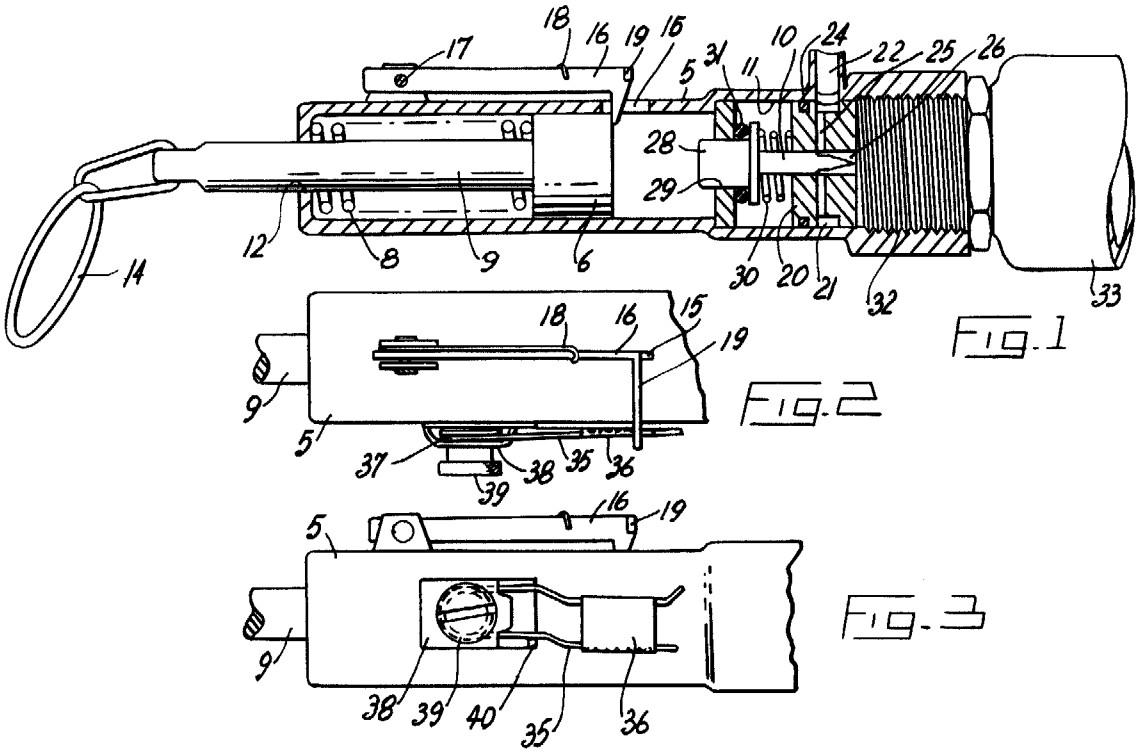
INVENTOR
Albert ROBY sr.
By Hetherstonhaugh & Co.
ATTORNEYS United States Patent Office Re. 25,983
Reissued Mar. 22, 1966

25,983
AUTOMATIC DEVICE FOR TRIGGERING MECHANISMS

Albert Roby, Sr., deceased, late of Montreal, Quebec, Canada, by John M. Schlesinger, executor, Montreal, Quebec, Canada; said Albert Roby, Sr., assignor to Leslie Roby, Montreal, Quebec, Canada Original No. 3,017,776, dated Jan. 23, 1962, Ser. No. 57,708, Sept. 22, 1960. Application for reissue Jan. 22, 1964, Ser. No. 350,930
2 Claims. (Cl. 74—2)

Matter enclosed in heavy brackets [ ] appears in the original patent but forms no part of this reissue specification; matter printed in italics indicates the additions made by reissue.

This invention relates to a device for releasing a trigger automatically upon contact with water.

A particular application of the invention is in connection with triggering mechanisms for puncturing the gas cylinders of inflatable life-preservers and the like. In accordance with present practices such triggering mechanisms are provided with a pull-cord or other similar device which the user must pull when needed in case of emergency. It often happens, however, that under emergency conditions the user of the life-preserver panics or is unconscious, so that the purpose of the life-preserver is totally defeated.

It has already been proposed to provide an automatic releasing device consisting of an electrical circuit which is short-circuited upon contact with water and thus releases the triggering mechanism. Such devices have the serious disadvantage of being bulky and not perfectly reliable.

The present invention turns, for a solution to this problem, to the field of chemistry. In connection with the invention the releasing device is constituted by a strip of paper which, when dry, holds the trigger in armed position against the action of a spring. The paper is of such a type or is treated in such a way that when it is wet it tears almost immediately so as to release the triggering mechanism and inflate the life-preserver.

To be operative in accordance with the invention the paper must have the bond between its fibers formed of a highly soluble chemical. The paper may be originally manufactured with such a fiber bond. Alternatively, conventional paper may be used and its original fiber bond removed, for example by steeping it in hot water or in a suitable hot solution; the fibers are then rebonded by means of chemicals which are readily soluble in water, yet when dry have sufficient stability to hold the trigger in armed position.

According to a preferred embodiment of the mechanical arrangement according to the invention, the trigger consists of a U-shaped spring juxtaposed to the pawl or other operating device of the triggering mechanism; the paper is in the form of an endless strip which holds the arms of the spring in compressed condition.

A preferred embodiment of the invention is illustrated in the accompanying drawings, in which:

FIG. 1 is a longitudinal section of the triggering mechanism.

FIG. 2 is a fragmentary top view.

FIG. 3 is a fragmentary side view.

Referring more particularly to the drawings 5 generally indicates a [cyclindrical] *cylindrical* housing in which a piston or hammer 6 is slidable. A coil spring 8 surrounding the shank 9 of hammer 6 normally forcefully urges the head of the hammer towards a firing pin 10 in a chamber 11 at one end of the housing 5. The end of shank 9 projects through an opening 12 in the end of housing 5 remote from the chamber 11 and is provided with a ring or other suitable retracting means 14.

A slot 15 in the top of housing 5 permits a pawl 16 to descend into the housing to retain the hammer 6 in a retracted position when the latter is retracted against the compression of spring 8. Pawl 16 is pivoted at one end as indicated at 17 and a pawl spring 18 normally biases the pawl downwardly to a position of engagement with the retracted hammer. The end of pawl 16 remote from its pivotal connection 17 is provided with a laterally projecting extension member 19.

Chamber 11 contains a member 20 which is annularly recessed at 21 and in communication with a discharge pipe 22 mounted on the outer surface of the chamber. A second annular recess receives a sealing ring 24 which engages the inner surface of the chamber to prevent gas escape. The member 20 has ports 25 which communicate between the annular recess 21 and a central bore 26 through which the firing pin 10 extends. The firing pin 10 has an enlarged base 28 which is slidable through a restricted passage 29. A coil spring 30 surrounds the firing pin 10 and is positioned between the inner end of member 20 and the firing pin base 28 to normally retract the firing pin. An O ring 31 about the base 28 serves as a seal which contacts the inner surface of the defining wall of the restricted passage 29 when the pin is retracted.

The outer end of chamber 11 is internally threaded at 32 to receive the threaded neck of a gas cylinder 33 which has a puncturable closure in the end thereof. In order to puncture the cylinder closure hammer 6 must be released by triggering the pawl 16. The hammer strikes the firing pin 10 at the base driving it forward through the member 20 to puncture the closure of the cylinder 33. The spring 30 then retracts the firing pin 10 permitting the gas to escape through ports 25 to the annular recess 21 and thence to the discharge pipe 22 for inflation of a life preserver (not shown).

It is to be understood that the above described triggering mechanism is given only by way of example. The releasing device according to the invention may be used in connection with any other type of triggering mechanism.

The device for triggering the pawl 16 comprises a U-shaped spring 35, the arms of which are compressed and secured by an endless binding strip 36. The spring 35 is pivotally mounted at its looped bight portion 37 by a retainer 38 and a bolt 39; the lower arm of the spring 35 engages a stop 40 on the housing 5. The upper arm underlies the extension member 19 of pawl 16 in spaced relation thereto.

It will be seen that when the binding strip 36 is broken by contact with water the spring 35 is released and its upper arm strikes the extension 19 thus lifting the pawl 16 and causing the hammer 6 to strike the firing pin 10 which in turn punctures the cylinder 33.

A preferred method of preparing the conventional, long-fiber type paper for the binding strip 36 is set forth hereunder.

EXAMPLE

A solution of borax ($Na_2O \cdot 2B_2O_3 \cdot 10H_2O$) in distilled or purified water in a proportion of 1 dram to 10 oz. is brought to a boil, or substantially close thereto. A long-fiber paper of high tensile strength is placed in the solution in a flat condition and is steeped for 3 to 4 hours. The paper is then removed and hung until air-dry, taking care not to press the solution out of the paper while it is removed and hung. The purpose of this first step is to open and swell the fibers and to remove the strengthening bonds between the fibers which have been used in the manufacture of the paper.

A solution of sodium bicarbonate ($NaHCO_3$) in distilled water in a proportion of 4 drams to 10 oz. is brought to a boil, or substantially close thereto. The dried paper from the first step is steeped in the hot solution for a period of 4 hours to ensure that the fibers are thoroughly saturated with sodium bicarbonates. The paper is then removed from the solution, laid flat and allowed to dry on the surface without pressure. Then the paper is laid between two sheets of paper and pressed with a heated iron, to press the fibers back into position and to hold the highly soluble sodium bicarbonate in the paper.

The finished product is capable of withstanding humidity of 100% in heat, yet upon contact with water it tears almost immediately.

The previous example is applicable where it is desired to modify existing paper to suit the purposes of the invention. It is also possible, however, to manufacture the paper originally. This is done by using conventional paper stock but by replacing the conventional bonding agents by a highly soluble chemical such as sodium bicarbonate and proceeding with the manufacture of the paper in a conventional manner. This latter method of preparing the paper is preferably used for large scale operation.

What I claim is:

1. A device for *actuating* [releasing] the pawl of a spring *triggering mechanism* [trigger] upon contact with water, comprising a U-shaped spring mounted on said mechanism by its bight portion and having one arm backed by said mechanism and the other arm in proximity of said pawl and movable against *a part of* said pawl for *actuating* [disengagement of] said pawl *to thereby actuate said triggering mechanism* [with said spring trigger], and [an endless] *a* strip of paper [surrounding] *affixed to* said arms of said U-shaped spring to hold them in compression, said [endless] strip of paper having the bond between its fibres formed of a highly water soluble chemical which disintegrates substantially instantaneously upon contact with water to release said spring under compression.

[2. A device for releasing the pawl of a spring trigger as set forth in claim 1, in which the said bond between the fibres of said endless strip of paper is formed by having steeped a paper in a hot solution of borax to remove its original bond, then steeped in a hot solution of sodium bicarbonate and then pressed under heat to bond the fibres with the highly soluble sodium bicarbonate.]

*3. A device for actuating a trigger automatically upon contact with water comprising, in combination, a trigger mechanism, said trigger mechanism being movable between cocked and released positions, and means for restraining said trigger mechanism in said cocked position, said last named means including paper having the bond between its fibers formed of a highly soluble sodium salt which paper disintegrates substantially instantaneously upon contact with water to release the trigger mechanism.*

References Cited by the Examiner

The following references, cited by the Examiner, are of record in the patented file of this patent or the original patent.

UNITED STATES PATENTS

| | | | |
|---|---|---|---|
| 994,050 | 5/1911 | Apt et al. | 74—2 X |
| 1,690,631 | 11/1928 | Genese. | |
| 1,857,497 | 5/1932 | Clapp. | |
| 2,466,513 | 4/1949 | Tratsch. | |
| 2,527,604 | 10/1950 | Walk | 74—2 X |
| 2,536,336 | 1/1951 | Watson. | |
| 2,674,324 | 4/1954 | Mascarini | 74—2 X |
| 2,694,875 | 4/1954 | Hoffmann. | |
| 2,877,784 | 3/1959 | Torgerson | 137—67 |
| 2,919,833 | 1/1960 | Wolshin. | |
| 2,964,050 | 12/1960 | Novak | 137—67 |
| 3,017,776 | 1/1962 | Roby | 74—2 |
| 3,034,922 | 5/1962 | Boe | 162—100 X |
| 3,145,573 | 8/1964 | Hebenstreit | 74—2 |

MILTON KAUFMAN, *Primary Examiner.*

BROUGHTON G. DURHAM, *Examiner.*